(No Model.)
W. S. STRICKLAND.
RUNNING GEAR FOR VEHICLES.
No. 353,236. Patented Nov. 23, 1886.
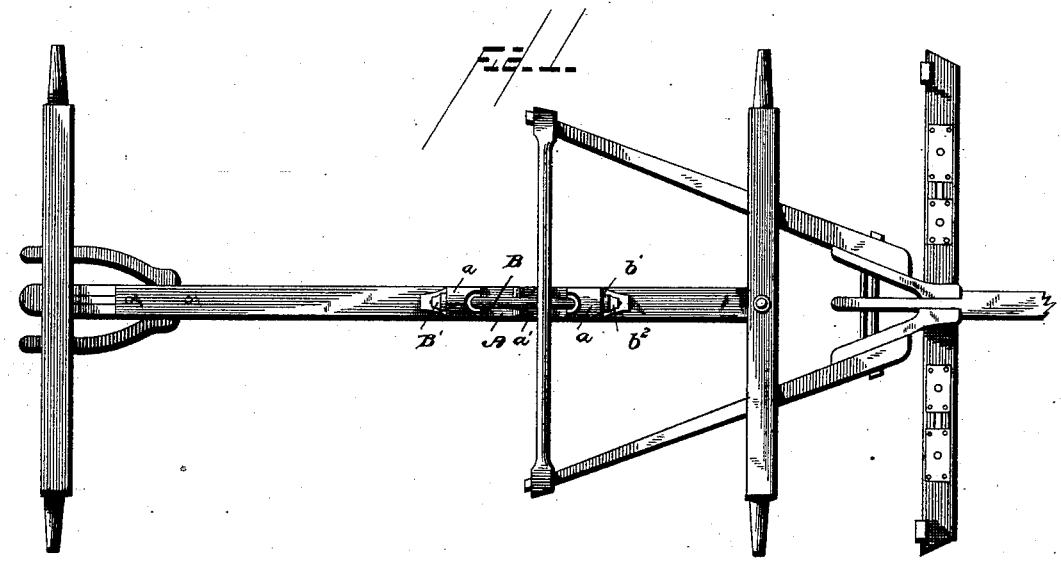

UNITED STATES PATENT OFFICE.

WILBUR S. STRICKLAND, OF BETHEL, OHIO.

RUNNING-GEAR FOR VEHICLES.

SPECIFICATION forming part of Letters Patent No. 353,236, dated November 23, 1886.

Application filed July 9, 1886. Serial No. 207,543. (No model.)

*To all whom it may concern:*

Be it known that I, WILBUR S. STRICKLAND, a citizen of the United States, residing at Bethel, in the county of Clermont and State of Ohio, have invented certain new and useful Improvements in Running-Gear, of which the following is a specification, reference being had therein to the accompanying drawings.

This invention has relation to improvements in running-gear for vehicles in general, but more particularly in the bearings for the front hounds upon the reach, whereby frictional contact and wear are lessened and cheapness and simplicity are promoted; and the invention consists of the detailed construction of the parts, substantially as hereinafter fully set forth, and pointed out in the claims.

In the drawings, Figure 1 is an inverted plan view of my improved anti-frictional bearing as applied for use, being shown in connection with the running-gear of a vehicle; and Fig. 2 is an enlarged inverted perspective view of my invention removed from said running-gear.

In a single instance of this class of inventions it has been disclosed that in order to properly dispose and journal the bearing-roll as therein employed for the support of or as a rest for the rear connecting piece or bar of the front hounds the reach is required to be recessed or hollowed out upon the under side to permit of the partial journaling of the shaft or said roll in said reach, the remaining portions of each journal of said roll-shaft being formed of caps fitting over the ends of said shaft and secured to the reach. This construction or form of bearing is objectionable, because multiplying parts and requiring the cutting or weakening of the reach, all of which are avoided by my invention, which will now be described.

In the organization of my invention I construct the same of a plate or bracket, A, and of a bearing-roll, B, which plate or bracket is cast with gudgeons $a$ near its ends to receive the ends of said shaft, and with an intermediate bearing or rest, $a'$, for said roll, being concaved in its bearing-surface to conform to the circumference or periphery of the latter. The intermediate bearing or rest, $a'$, forms a support or bearing for the roll B about opposite the point of bearing of the rear connecting-bar of the hounds upon said roll, whereby the latter is re-enforced or enabled to more effectively resist bending from pressure and concussions received thereon from the said rear connecting-bar of the hounds, which concussions are due to the movements of the vehicle over rough roads. The roll B is headed at one end at B', and fitted at one end with a collar or disk, $b'$, having a nut-like extension, $b^2$, preferably angular in contour, and receiving a correspondingly-shaped extension, $c$, of the roll B. A pin, $c'$, passed through the nut-like extension $b^2$ of the collar $b'$ and the extension $c$ of the roll B, secures the said collar in place, and permits, when necessary to replace the roll by another, the ready removal of said roll by withdrawing said pin, and then the roll taking it by its headed end. This end of the roll B may also be formed with a nut-like extension, as shown, for the convenient withdrawl or insertion of the same.

The casting or plate A is provided with one or more holes at each end for the passage through it of the fastening screws or nails connecting it to the reach, the under side thereof. From the foregoing it will be seen that the advantages claimed for my invention over what has been previously done in this line of inventions, as above disclosed, is fully borne out—viz., no cutting or recessing of the reach is required, which obviously is greatly objectionable, because weakening the same; the forming of half-bearings in the reach for the axis of the bearing-roll, the other half of each bearing of said roll-axis being formed of separate caps, and therefore lessening the number of parts, simplifying construction, cheapening the appliance, and rendering it less difficult of application (to the reach) for use.

What I claim is—

1. The combination of the bearing-roll with the plate or casting having the end gudgeons and intermediate additional bearing, as and for the purpose set forth.

2. The combination, with the front hound and reach of the running-gear of a vehicle, of the casting or plate having the end gudgeons and intermediate or additional bearing, and the roll journaled in said gudgeons and resting in said intermediate or additional bearing, substantially as and for the purpose set forth.

In testimony whereof I affix my signature in presence of two witnesses.

WILBUR S. STRICKLAND.

Witnesses:
J. M. McGREW,
E. L. WHITE.